Feb. 23, 1943.         F. JERDONE, JR                2,312,249
             NECKTIE PROTECTING AND CONDITIONING MEANS
                    Filed Aug. 3, 1940          9 Sheets-Sheet 1
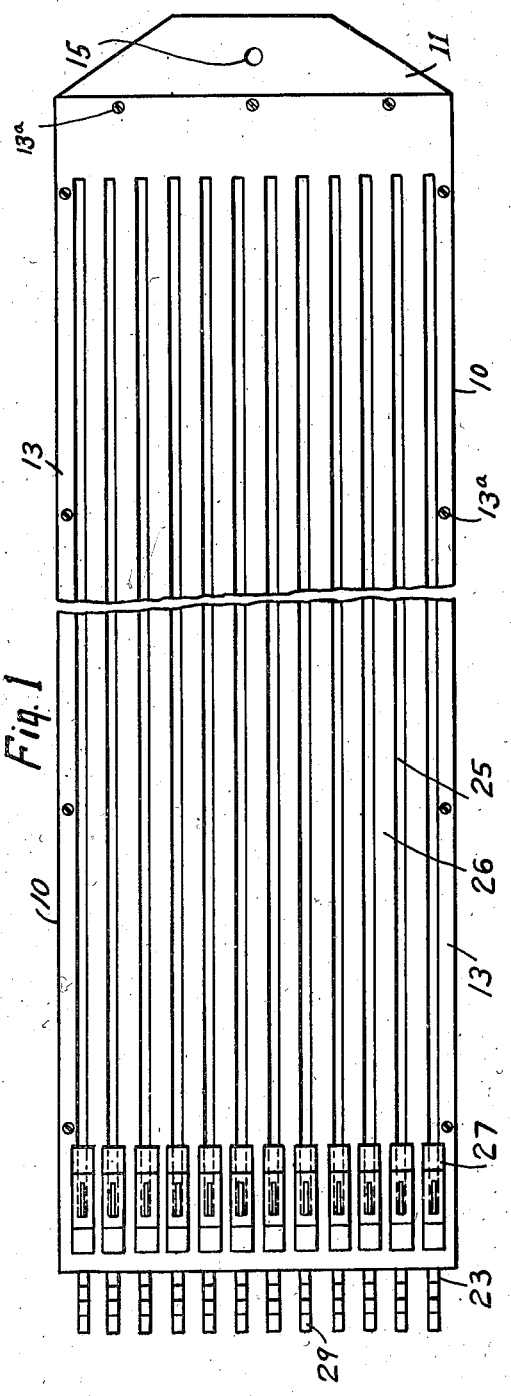
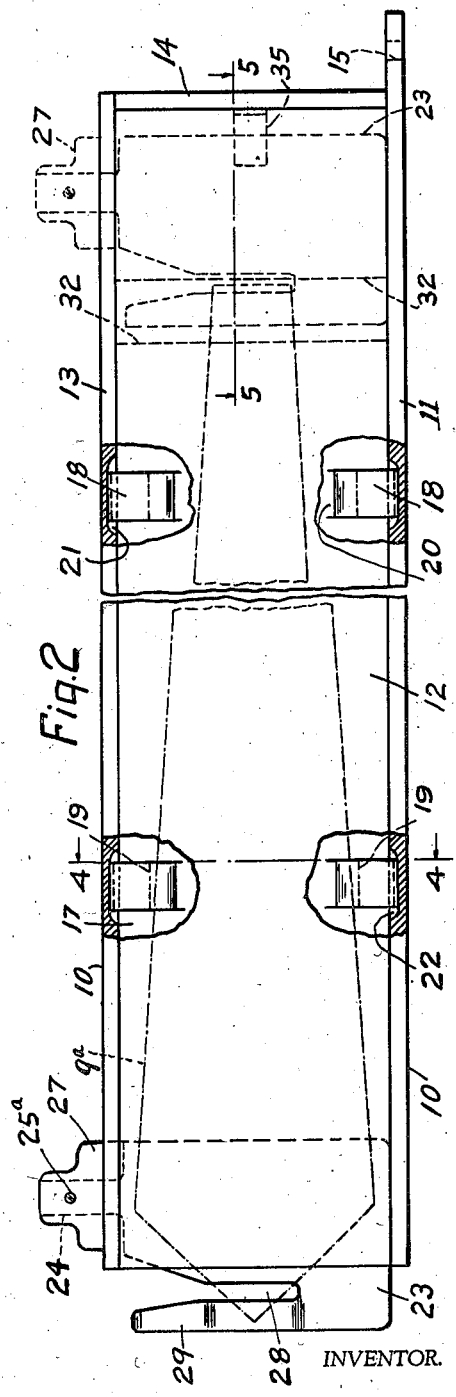
INVENTOR.
Francis Jerdone Jr

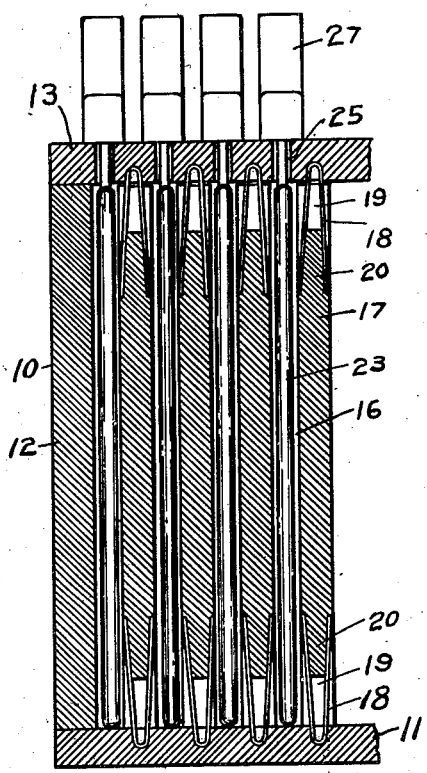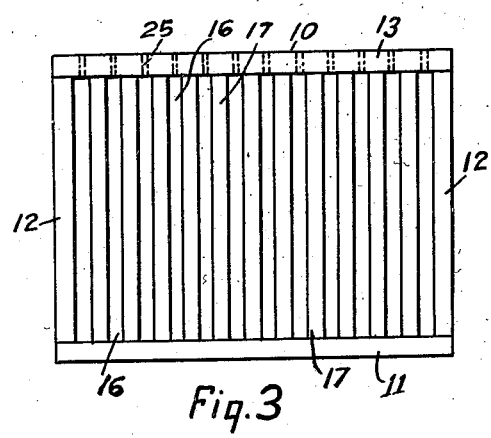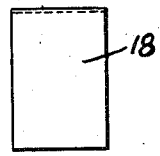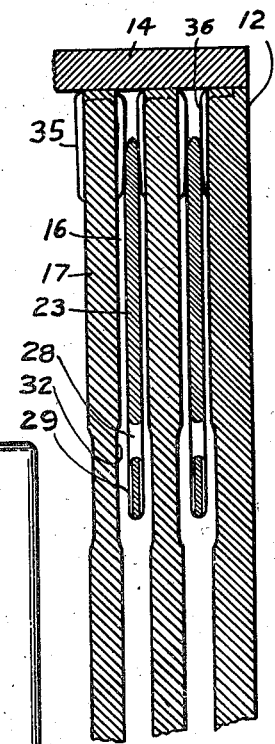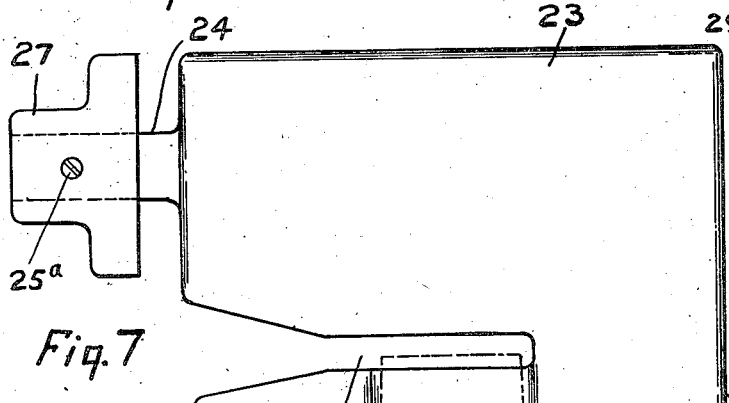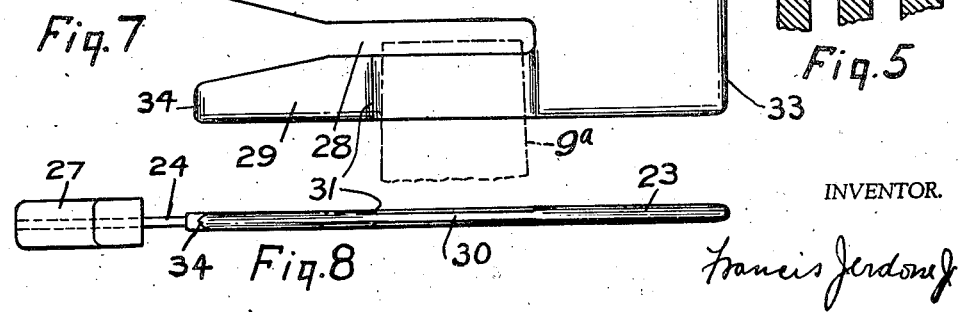

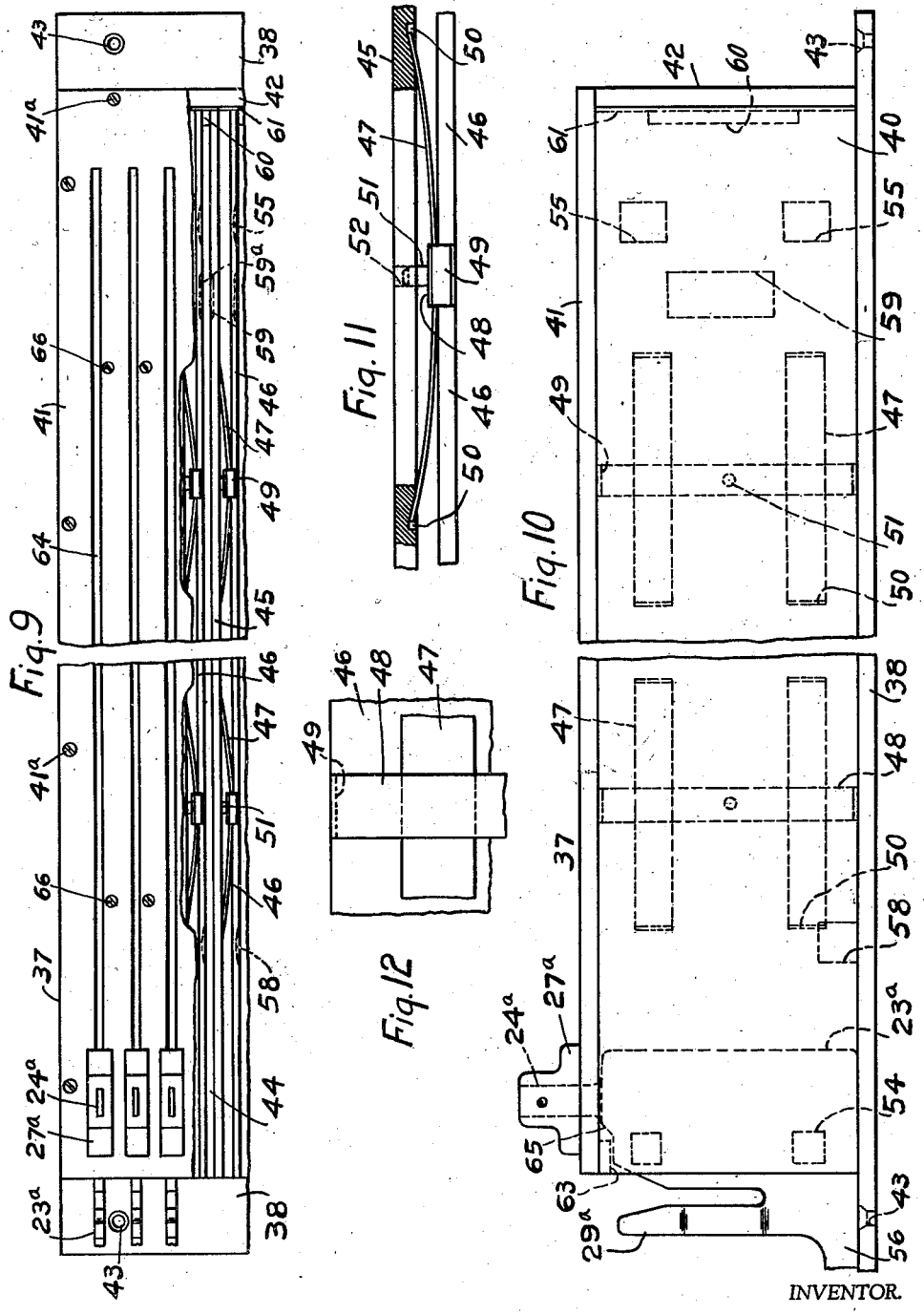

Feb. 23, 1943.  F. JERDONE, JR  2,312,249
NECKTIE PROTECTING AND CONDITIONING MEANS
Filed Aug. 3, 1940                9 Sheets-Sheet 4

INVENTOR.
Francis Jerdone Jr

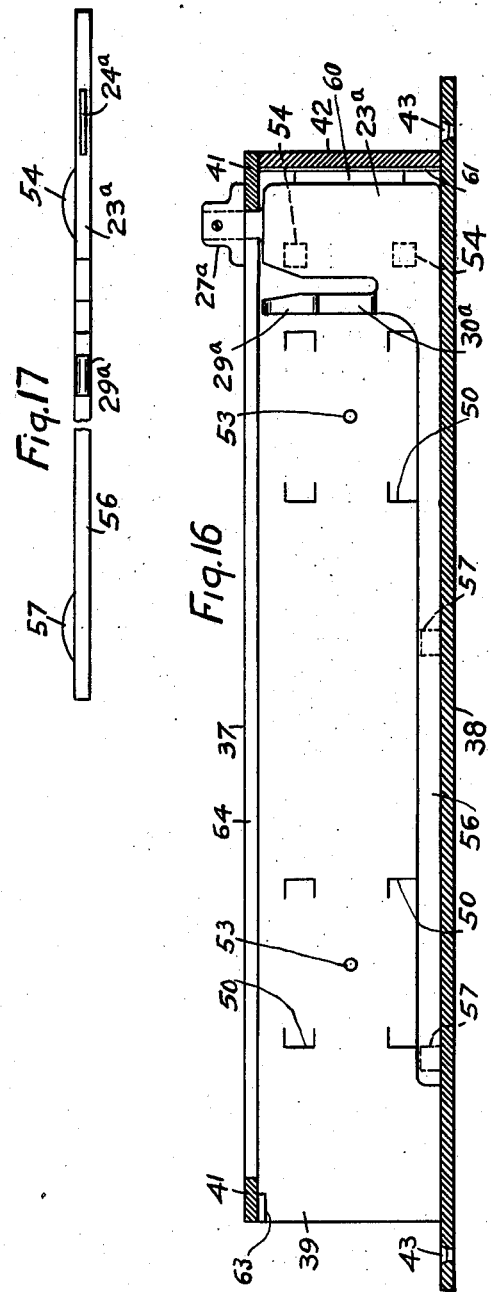

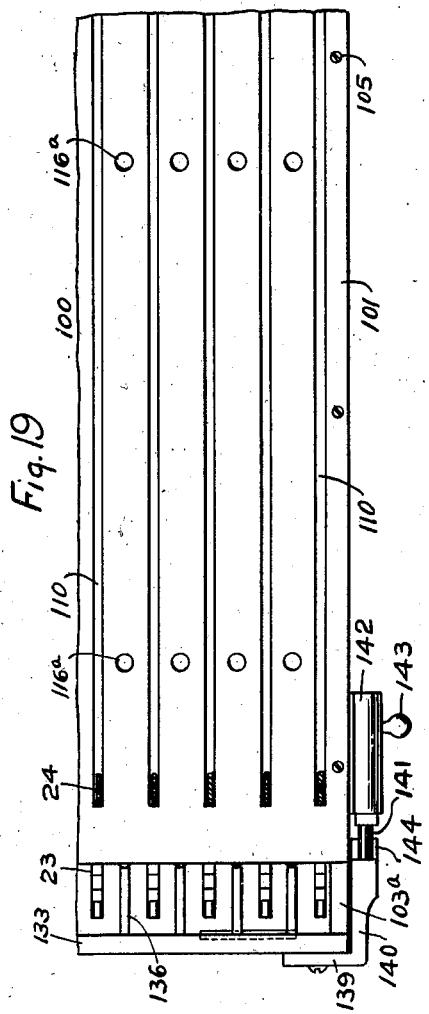

Feb. 23, 1943.    F. JERDONE, JR    2,312,249
NECKTIE PROTECTING AND CONDITIONING MEANS
Filed Aug. 3, 1940    9 Sheets-Sheet 7
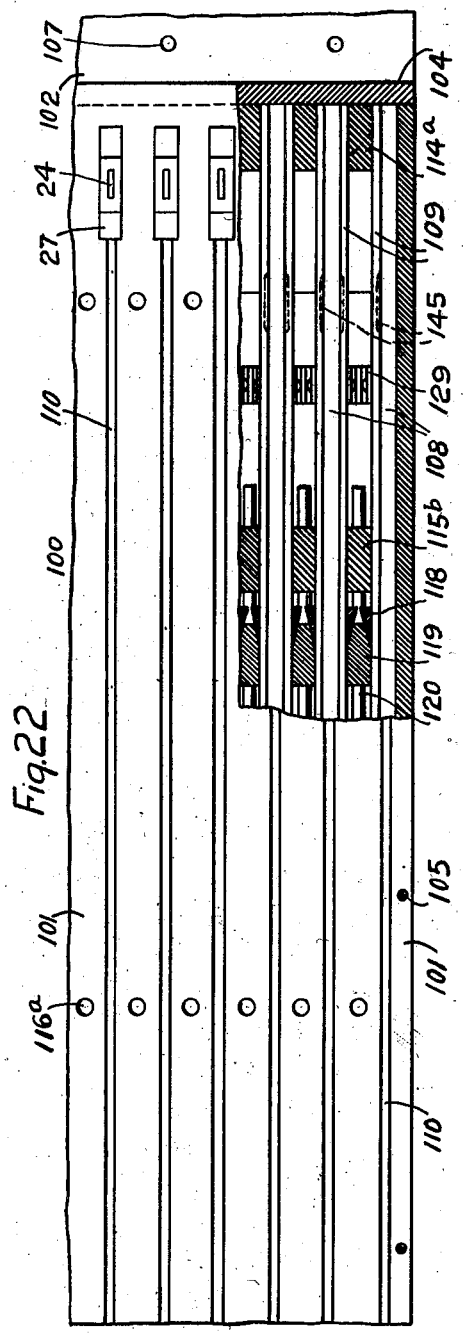
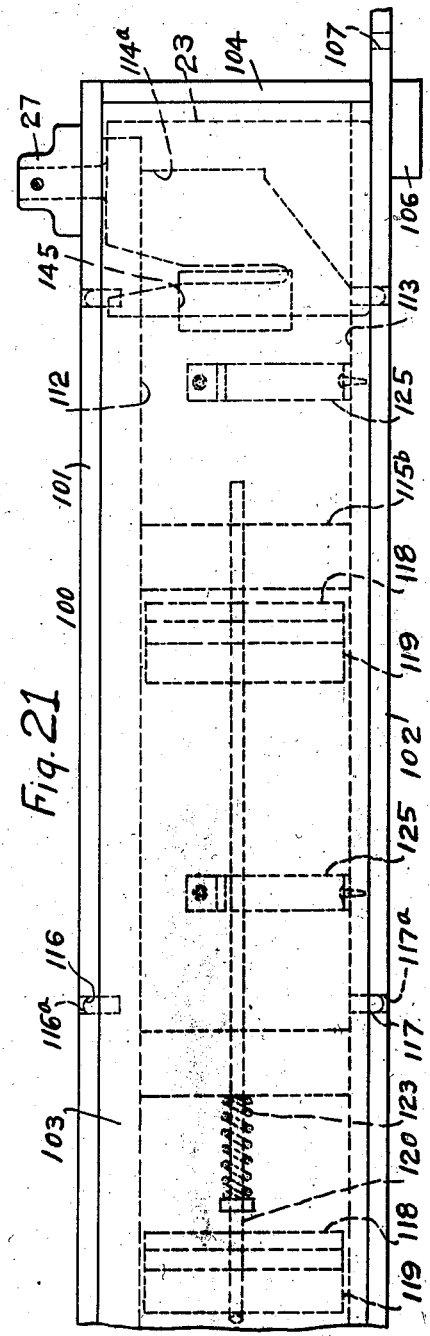
INVENTOR.
Francis Jerdone Jr

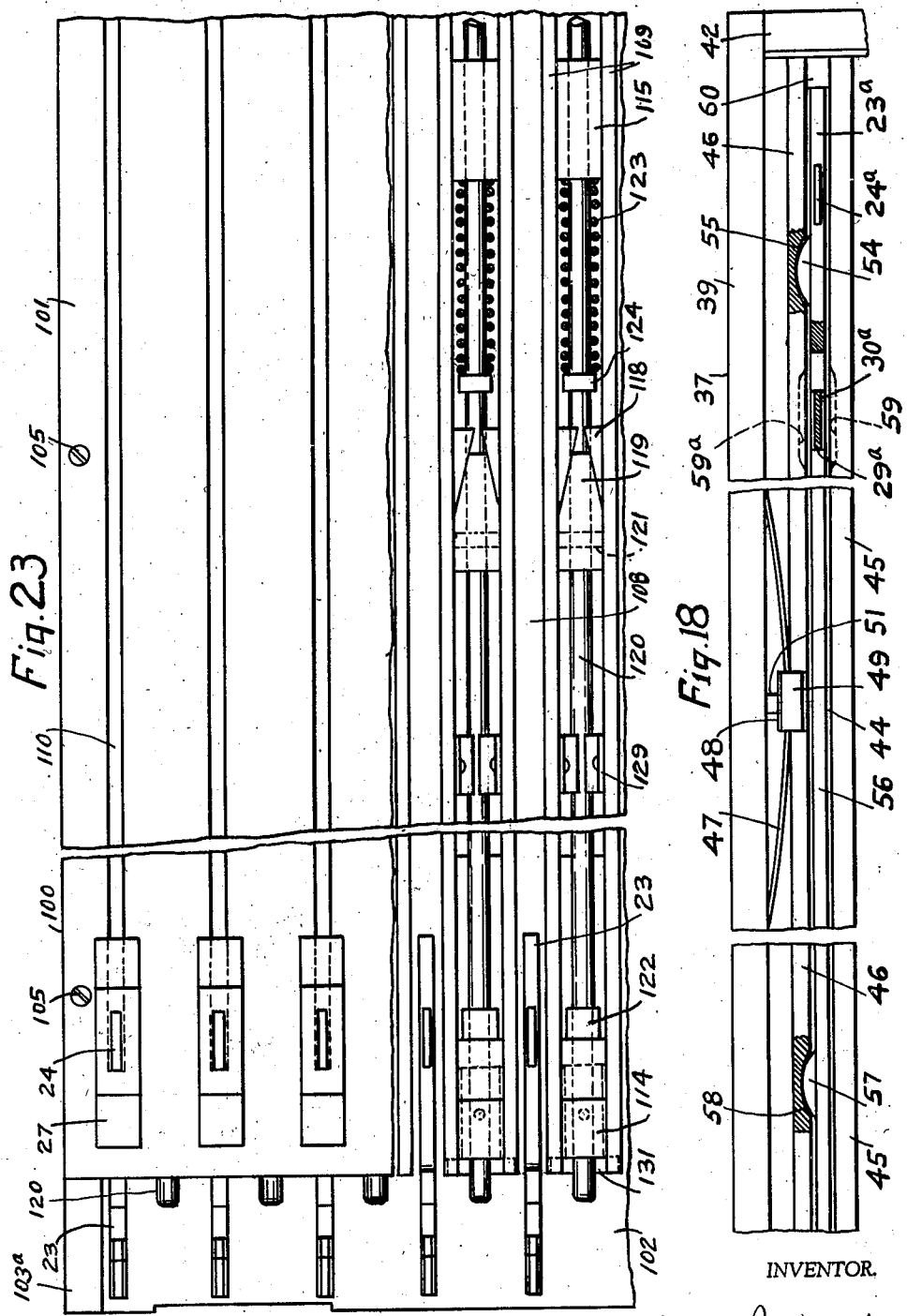

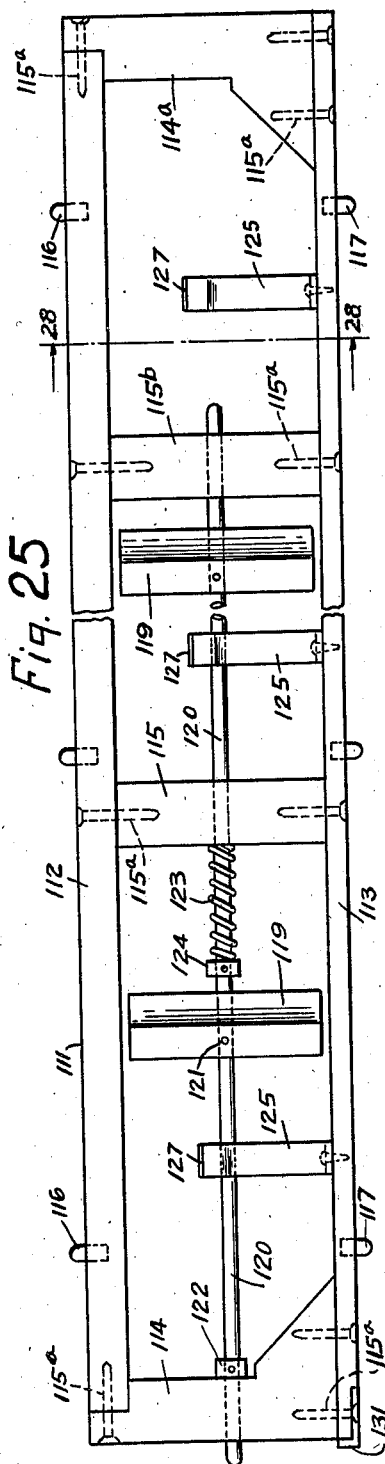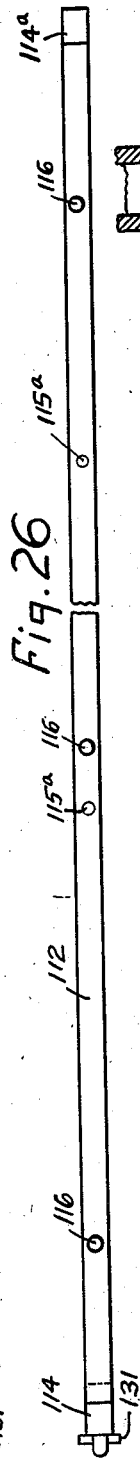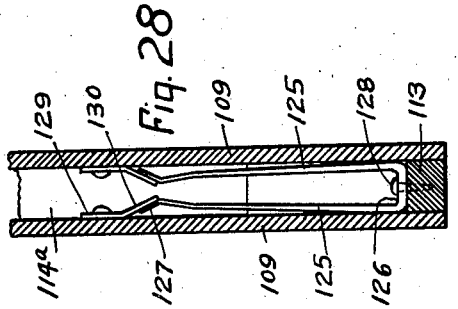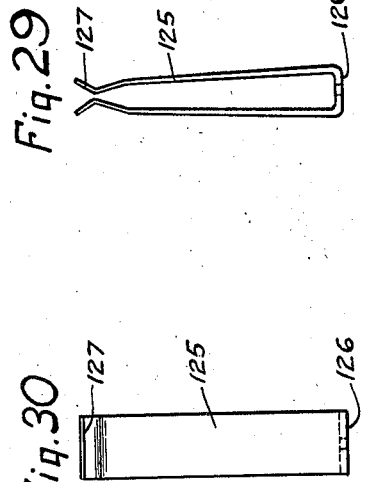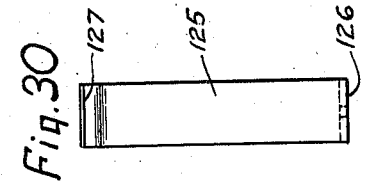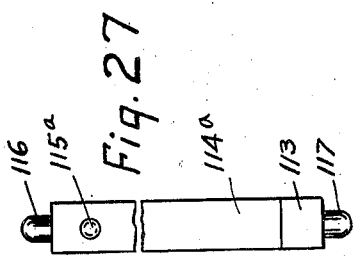

Patented Feb. 23, 1943

2,312,249

UNITED STATES PATENT OFFICE 2,312,249

NECKTIE PROTECTING AND CONDITIONING MEANS

Francis Jerdone, Jr., Rochester, N. Y.

Application August 3, 1940, Serial No. 350,672

17 Claims. (Cl. 38—72)

The present invention relates to improved protecting and conditioning means for neckties and the like and particularly those of the four-in-hand class and has for its object to provide simplified means for maintaining the shape of the neckties and for conveniently segregating the same.

Another object of the invention is to provide improved means for individually supporting the neckties, which also serves to remove therefrom wrinkles or creases resulting from wear and other causes.

Another object of the invention is to provide improved means for enclosing one or more neckties for protection against dust and other foreign matter in conjunction with means designed to be conveniently used to position the neckties within the enclosing means.

A further object of the invention is to provide an improved necktie supporting unit, such for example as a case or cabinet having a plurality of pockets or spaces for individually receiving and protecting the neckties and in which the shape of each is maintained and from which the ties may be independently removed at will.

Another object of the invention is to provide, in conjunction with means forming an elongated necktie-receiving pocket, a supporting device or carrier for a necktie folded upon itself substantially about its middle portion, which device is associated with said means and designed to be moved relative thereto to move the necktie within the pocket.

A further object of the invention is to provide a necktie receiving pocket or recess formed of spaced relatively movable side walls, together with means for moving one of said walls relative to another to exert pressure on a necktie supported within the pocket.

A further object of the invention is to provide an improved necktie receiving and protecting device which will serve to effectively press the neckties carried thereby.

Another object of the invention is to provide in combination with a necktie receiving pocket formed of spaced walls, in which one is provided with supporting means for urging it in engagement with a necktie within the pocket, a supporting device for moving the necktie inwardly and outwardly of the pocket and which serves upon initial outward movement to laterally shift said wall to relieve the pressure on the necktie whereby to free it for withdrawal from the pocket.

Another object of the invention is to provide means affording a plurality of necktie receiving pockets or recesses, each including relatively movable parts for pressing a necktie within the pocket corresponding thereto, in conjunction with means operable to simultaneously effect relative movement between the parts of the different pockets to press the neckties within said pockets.

A further object of the invention is to provide a necktie receiving pocket having oppositely disposed side walls in conjunction with a resilient supporting member or carrier for a necktie movable longitudinally of the pocket to position a necktie therein and designed to cooperate with said walls to press the necktie within the pocket.

A further object of the invention is to provide a necktie holding case or cabinet having spaced walls forming a series of necktie receiving pockets, associated with each of which is a carrier for a necktie movable longitudinally of its corresponding pocket to position a necktie therein.

Another object of the invention is to provide an improved holder or carrier for supporting a necktie folded upon itself at a point substantially midway between its ends, by which means the necktie can be readily moved within a protecting recess or pocket provided therefor.

To these and other ends the invention resides in certain improvements and combinations of parts, all as will be hereinafter more fully described, the novel features being pointed out in the claims at the end of the specification.

In the drawings:

Fig. 1 is a front view of a case or cabinet embodying one form of the invention;

Fig. 2 is a side elevation of the same, portions of which are broken away to illustrate certain interior parts of the case;

Fig. 3 is an end elevation of the case as viewed from the left of Fig. 2 with the necktie holders or carriers removed;

Fig. 4 is a fragmentary transverse section substantially on line 4—4 of Fig. 2 and drawn to an enlarged scale;

Fig. 5 is a fragmentary longitudinal section substantially on line 5—5 of Fig. 2 showing the necktie holders and means for frictionally supporting them in service position;

Fig. 6 is a side view of one of the substantially U-shaped wall supporting members shown on Fig. 4;

Fig. 7 is a side elevation of one of the necktie holders or carriers shown in section in Fig. 5;

Fig. 8 is a plan of the holder as viewed from the bottom of the figure;

Fig. 9 is a front view of a portion of a modified form of case or cabinet with a portion of the cover removed to show the walls of the cabinet which form the necktie receiving pockets and also the springs for urging certain of the walls in engagement with the neckties disposed within said pockets;

Fig. 10 is a side view of the cabinet shown in Fig. 9;

Fig. 11 is a fragmentary part sectional view drawn to an enlarged scale and showing the manner of mounting the springs on the fixed and movable walls of the cabinet which form the tie receiving pockets;

Fig. 12 is a side view of a portion of one of the movable walls of the cabinet upon which is mounted one of the springs and spring supporting plates shown in Fig. 9;

Fig. 16 is a longitudinal section through the cabinet shown in Figs. 9 and 10 drawn to a reduced scale and showing the necktie holder, partially indicated in Fig. 10, at its innermost position within the cabinet.

Fig. 17 is a fragmentary view of the necktie holder shown in Fig. 16, drawn to an enlarged scale and looking at the front edge thereof;

Fig. 18 is a front view of a portion of the case or cabinet shown in Figs. 9, 10 and 16, drawn to an enlarged scale and having the front wall removed to show the arrangement of the inner pocket-forming walls and one of the holders between said walls for moving the necktie into and out of the pocket formed thereby;

Fig. 19 is a fragmentary part sectional front view of the lower portion of a modified case or cabinet having means for exerting pressure on a plurality of neckties disposed with the pockets of the cabinet;

Fig. 20 is a side view of the portion of the cabinet shown in Fig. 19;

Fig. 21 is a side view of the upper portion of the modified cabinet;

Fig. 22 is a fragmentary part sectional front view of the upper portion of the modified cabinet, showing a part of the mechanism for exerting pressure on the neckties within the pockets provided therefor;

Fig. 23 is a similar view of the lower portion of the cabinet, drawn to an enlarged scale with the hinged operating element shown in Fig. 20 omitted, the cabinet having a portion of the cover removed to show the mechanism by which the walls forming the necktie-receiving pockets are moved to press the neckties contained within the pockets;

Fig. 25 is a fragmentary side view of one of a plurality of unitary frame structures for use within the modified cabinet, designed to support the movable pocket-forming walls thereof and the operating mechanism for laterally shifting said walls to press the neckties therebetween;

Fig. 26 is a view of the unitary structure of Fig. 25, looking at the front face thereof;

Fig. 27 is a fragmentary end view of the unitary frame structure shown in Fig. 25, as viewed from the right thereof and drawn to an enlarged scale.

Fig. 28 is a transverse section on line 28—28 of Fig. 25 showing the movable pocket-forming walls applied to the frame unit shown in Fig. 25;

Fig. 29 is a detail view of the resilient wall supporting means shown in Fig. 28, and Fig. 30 is a side view of the same.

The same reference numerals throughout the several views indicate the same parts.

Figure 24:
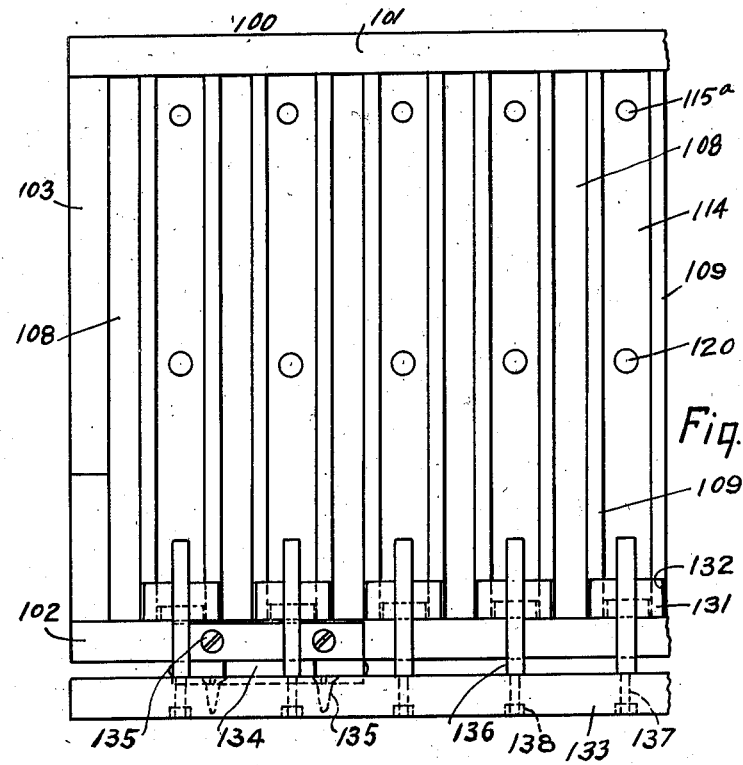
Fig. 24 is a fragmentary view looking at the lower end of the cabinet shown in Fig. 23 with the hinged operating element shown in lowered position as indicated by dotted lines in Fig. 20.

Heretofore, no satisfactory means has been provided for segregating and protecting neckties, or for caring for them in such a manner as to constantly maintain their shape when not in use, as by confining them between protecting surfaces or providing means for successfully removing wrinkles or creases therefrom, resulting from wear or other causes. Generally the neckties are loosely deposited within drawers, in superimposed relation, where they become mixed or entangled, under which conditions it is difficult to readily pick out or select the one desired, or to in any way contribute to the removal of wrinkles or creases from the neckties.

The invention contemplates the segregation of the neckties by providing individual pockets or spacings therefor, in certain of which the shape of the necktie is maintained by its close proximity to or contact with the walls of the pockets, and in other instances the ties are subjected to relatively light pressure for the same purpose. In still other instances the walls forming the pockets are made relatively movable one laterally of another and means is provided for urging one in the direction of another to press a necktie interposed between said walls for the purpose of restoring its shape by pressing out any wrinkles or creases therein, resulting from wear or other causes. However, in each of the designs disclosed the neckties can be readily assembled in their respective positions and conveniently selected and withdrawn when desired.

Furthermore, the invention is designed to overcome the disadvantages of previous methods of taking care of neckties and the like when not in use and embodies improved devices for separately supporting the neckties in such manner as to securely hold them in a definite relation one relative to another which devices can be operated by the use of the fingers to move the neckties within as well as to remove them from their protecting pockets.

Referring to the drawings, 10 designates generally a necktie case or cabinet for protecting a plurality of neckties or the like, one of which is shown more or less conventionally in Fig. 2 and designated by the reference character 9a. The case 10 which is of rectangular construction is illustrated in Figs. 1 to 5 inclusive and embodies a rear wall 11, side walls 12, a front wall 13 and an end wall 14, all being connected, with the exception of the front wall, by any suitable means such for example as glue or the like, or if preferred, by screws or nails, not shown. The front wall is detachably connected with the end and the side walls by screws 13a as shown in Fig. 1. The rear wall 11 is extended beyond the closed end of the case and provided with one or more apertures 15 for the reception of screws or nails which may be used to secure the case in upright position upon any suitable support, such as a portable stand or a wall of a room, not shown.

Although the case or receptacle illustrated in the drawings is preferably formed of wood it will be understood that it may be constructed of metal or any other suitable material.

The interior of the case is provided with a plurality of longitudinally extending necktie receiving pockets or enclosures 16, formed of a series of walls or partitions 17 suitably supported within the case and spaced predetermined distances apart to afford pockets of the desired width, it being understood that the outermost pockets at the opposite sides of the case are formed by the side walls 12 thereof and the inner walls 17 next adjacent thereto. The walls 17 are preferably formed of smooth relatively thin sheets of material which may be either wood, metal or a suitable composition.

It will be further understood that the walls or partitions 17 may be rigidly held between the front and rear walls by nails, screws or other securing means. However it is preferred to construct the partitions of resilient or flexible material and also to support them so that they may have a slight lateral movement when moving the neckties therebetween, should pressure be exerted against the sides of the partitions by the neckties or the holders therefor. In other words, if the partitions are formed of flexible or resilient material they will yield under light pressure and compensate for any slight differences in the thicknesses of the material from which the neckties are made, that is when moving the neckties within the pockets. Moreover, each pocket may be of such proportions as to afford a space of minimum width for the free movement of a necktie within the pocket, in which case the opposite portions of the necktie will be flattened out one upon another under relatively light pressure sufficient however to remove wrinkles or creases from the tie whereby to improve the appearance of the same.

One method of mounting the pocket forming walls 17 for more or less free lateral movement within the case 10 is by means of the substantially U-shaped springs or resilient supporting members 18 shown in Figs. 2 and 6. Preparatory to applying these members to the walls 17 the latter are cut away to provide a plurality of oppositely disposed openings 19 of rectangular shape. Inwardly of the openings the material of the wall is further cut away to provide the tapered tongues or beveled portions 20 which extend within the open ends of the springs 18, as best shown in Fig. 4. The free ends of the springs will be spread apart slightly by said tongues when positioning the springs thereon, the springs being frictionally held in position through engagement with the tongues by reason of the tension of the springs.

At points opposite the cuts 19 of the walls 17 the front and rear walls 13 and 11 of the case 10 are provided with relatively short grooves or recesses 21 and 22 respectively within which grooves the springs are seated and held as shown in Figs. 2 and 4. The rows of the grooves of the front and rear walls are spaced so that when the walls 17 are in assembled relation within the case they will form the pockets 16 therebetween.

It will be understood that the walls 17 can readily be assembled within the case before applying the cover or front wall 13 thereto and that when said cover is applied the outer portions of the front springs 18 will take into the grooves 21 of the cover, after which the latter can readily be secured in position upon the side and end walls 12 and 14 by the screws 13a as shown in Fig. 1.

Any suitable means may be provided for moving the neckties within the pockets 16 through the open ends thereof and upwardly or longitudinally to the desired positions within the pockets. The preferred means provided for this purpose comprises a necktie holder or carrier 23 which is in the form of a relatively thin plate-like member. The holders or carriers are provided with extensions 24 which project through the slots 25 of the front wall 13 of the case and between the relatively narrow bars or strip-like portions 26 of said wall, Figs. 1 and 4. Operating members 27 for the holders are secured on the extensions 24 by screws 24a and can be conveniently grasped by the fingers and moved longitudinally of the case between the full and dotted line positions of said members as shown in Fig. 2, whereby to move the holders to position the neckties within the case and to remove them therefrom. The holder is slotted at 28 to provide a finger or supporting member 29 for the necktie which is to be disposed on said finger as shown by dotted lines in Figs. 2 and 7.

The finger or supporting member is cut away at its opposite sides for a portion of its length to provide a relatively thin necktie receiving portion 30, thus forming shoulders 31 on said member which lie in advance of the necktie and tend to prevent accidental displacement of the same forwardly of the supporting member from the position shown in Fig. 7. The necktie will therefore be maintained in position between the front and rear walls of the case, or in other words centered within the pocket during movement therein.

The thickness of the body of the carrier 23, or that portion above the necktie is of course less than the width of the pocket 16 so as to avoid the possibility of a binding action between the carrier and the walls 17 forming the pocket. The thickness of said body is also less than the combined thicknesses of the reduced portion 30 of the finger member 29 and the opposite portions of the tie folded about the finger member. It will be further understood that the width of each pocket is substantially the same as the combined thicknesses of the two portions of the necktie folded one upon another, thus affording substantial contact between the outer faces of said necktie portions and said surfaces when the necktie is in proper position within the pocket whereby to insure the smoothing or flattening out of any wrinkles, ridges or creases in the necktie and the maintenance of said folded portions in superimposed relation and in contact one with another.

It has been found that where the neckties have been allowed to remain within the pockets of the case a comparatively short time, under the conditions just described, that upon removal of the same from the pockets they are free from wrinkles and have the appearance of being new or of having been pressed.

In order to avoid the possibility of the portions of the necktie overlying the part 30 of the supporting member 29 from spreading the laterally movable walls 17 apart a distance greater than the combined thicknesses of the opposite depending portions of the necktie when the holder or carrier is in its uppermost position within the pocket said walls are provided with transversely extending recesses 32, Figs. 2 and 5, which accommodate the portions of the necktie on the part 30 of the supporting finger 29, thus allowing the outer faces of the depending portions of the necktie to contact the walls or partitions 17 which form the pockets.

The members 27 for moving the necktie holders up and down within the pockets 16 are preferably slotted to receive the extensions 24 of the holders and, as previously stated are secured on the extensions by the screws 25a.

If preferred, the holders may be assembled within the pockets of the case before applying the operating members 27 to the extensions and also before positioning the cover or front wall 13 upon the body of the case. However, by rounding or beveling the rear edges 33 of the holders as shown the latter can be positioned within the pockets after the cover has been applied to the case, by inserting said edges within the slots 25 of the cover and pushing the holder inwardly, during the initial operation of which the flexible strip-like members 26 of the cover will be deflected in opposite directions to permit the holder to be moved inwardly to final position, as shown in Fig. 4.

Likewise by beveling or rounding the ends 34 of the finger members 29 of the holders, as shown in Figs. 7 and 8, the holders may readily be removed from the case without removal of the cover 13. This can be done by grasping the operating member 27 of the holder and swinging it toward the upper or closed end of the case which will cause the holder to pivot about its upper right hand corner, Fig. 7, thereby moving the beveled end 34 of the finger member into and through the slot 25 of the cover to spread the flexible strip-like portions 26 of the latter, thus permitting the holder to be withdrawn through the slot. The operations of positioning the holders within and withdrawing them from the pockets by movement through the slots can more easily be performed when the holders are positioned substantially midway between the ends of the slots at which points the strip-like members 26 can be more readily deflected than at points near the ends of the slots.

Means is provided for frictionally supporting the necktie holders or carriers in the upper end of the case, which preferably comprises the U-shaped springs 35 shown in Figs. 2 and 5, the walls 17 being notched to receive the transverse portions of said springs. The leaves of the springs are spread apart upon inserting the springs on said walls, said leaves serving to grip the walls when the springs are in position thereon, said leaves being tapered to facilitate movement of the upper beveled portions of the holders between and in frictional engagement with the leaves at the opposite sides of the pockets. In the pockets formed in part by the two side walls 12 of the case a plate 36 is positioned on the inner face of each of said walls opposite the springs 35 nearest thereto, the plate cooperating with one leaf of the spring to frictionally support the necktie holder within its pocket, said plate being preferably supported by an outwardly turned portion disposed in a recess formed in the upper end of the side wall, as also shown in Fig. 5. It will be understood that the springs 35 and plates 36 are held against longitudinal movement in an outward direction by the end wall 14 of the case.

It will be understood that the tie carriers are limited in their up and down movements within the case by contact of the upper and lower edge portions of the extensions 24 of the carriers respectively with the top and bottom portions of the front wall 13, upon movement of the carrier operating members 27 between the full and dotted line positions shown in Fig. 2.

In the operation of the invention disclosed in Figs. 1 to 8 inclusive and assuming that the case is in vertical position upon a wall or other support and that the necktie carriers are in their lowermost positions, as shown in Figs. 1 and 2, each of a selected number of neckties of the four-in-hand class can quickly be folded about its middle portion to provide a loop, which by the use of one hand, can be inserted upon the horizontal finger 29 of one of the carriers so that the opposite portions of the tie will extend downwardly from the finger. This operation can be repeated until all of the carriers are loaded, after which, the ties may be moved into position within the pockets 16 by grasping the operating members 27 of the carriers and moving them upwardly to the dotted line position shown in Fig. 2. However, if preferred each necktie, upon being placed upon one of the carriers may be moved into position within the case by an upward movement of the carrier to the proper position therein, before positioning any of the remaining ties upon the fingers, this operation being continued until the pockets 16 have been filled.

It will be understood that different methods may be employed by which the user of the neckties can determine in advance the pockets within which the different ties are disposed so that selection can be made and the tie desired at any given time removed without removal of any of the remaining ties. One method by which this may be done is to limit movement of the carriers to positions within the protecting pockets 16 at which the free end portions of the neckties will extend slightly below the bottom of the case, where they will be exposed as indicated by the necktie shown by dotted lines in Fig. 2, thus permitting the user to select any one of the ties desired.

Another method by which selection can be made also includes the idea of normally maintaining the ties completely within the pockets in which case the operator, by the use of the fingers of one hand can simultaneously effect a slight lowering of a number of the actuating members 27 and the carriers corresponding thereto so as to expose the ends of the ties on said carriers at the bottom of the case whereby to permit the user to select and remove the necktie desired, after which the remaining lowered carriers can be pushed upwardly to normal position as shown by dotted lines in Fig. 2.

In order to facilitate free and easy movement of the neckties up and down within the pockets of the case the surfaces of the pocket-forming walls contacted by the opposite portions of the necktie are smoothed and polished so as to offer a minimum of frictional resistance to the movement of the ties thereon. Moreover, in order to avoid the possibility of the outer or exposed surfaces of the neckties being made shiny by movement of the same in contact with the polished faces of said walls it is only necessary to fold the ties, preparatory to placing them upon the carriers, so that said outer faces will be disposed inwardly and in contact one with another, in which case the inner face portions of the ties will lie outwardly and in position to contact said wall surfaces when the ties are disposed within the pockets.

The modified necktie holding case illustrated in Figs. 9 to 18 inclusive is generally similar to that shown in Figs. 1 to 8 inclusive, but is provided with means for resiliently urging one wall of each of the tie receiving pockets in the direction of the opposite wall thereof to press the tie within the pocket. Means is also provided for shifting the movable wall to relieve the pressure exerted thereby on the tie upon the initial movement in one direction of the means for supporting the tie within the pocket, which means preferably comprises a tie holder similar to the one shown in Figs. 7 and 8, except for the added parts provided for moving said walls. In Figs. 9 to 16 inclusive the modified case is designated generally by the reference character 37. The case comprises a rear wall 38, side walls 39 and 40, a front wall 41 and an end wall 42, all of which, except the front wall, being connected by suitable means, such for example as glue or the like or by screws or nails, not shown. The front wall 41 is detachably connected with the end and side walls of the case preferably by screws 41a, as shown in Fig. 9. The rear wall 38 is extended beyond both ends of the case and provided with apertures 43 for the reception of screws or other fastening devices, not shown, by which the case may be readily attached, in vertical position, to a suitable support not shown.

The tie receiving pockets 44 of the case 37, with one exception, are each formed by a fixed wall 45 and a movable wall 46 spaced therefrom, the exception being the pocket, not shown, nearest to the side wall 40 of the case, which is formed by the side wall 40 and one of the movable walls 46. The fixed walls 45 extend longitudinally between the side walls and may be secured to the rear wall 38 by the use of glue or any suitable adhesive material, or by screws or nails, not shown. The movable walls 46 are substantially parallel to the fixed walls 45 and are each provided with resilient operating means, such for example as a plurality of bowed leaf springs 47 disposed between said fixed and movable walls as best shown in Figs. 9 to 11 inclusive. The springs are shown in pairs and those of each pair are suitably connected, as by spot welding, with a supporting plate 48, provided with offset ends 49 disposed within notches 50 formed in the front and rear edges of the movable walls 46 on which the springs 47 are disposed, Figs. 9 to 13 inclusive. The ends of the springs are preferably disposed within recesses 50 formed within the fixed walls 45 of the case within which they are free to move, upon lateral shifting of the movable walls 46 which occurs upon moving the necktie holders or carriers 23a with the ties thereon downwardly within the pockets 44 from the positions shown in Figs. 16 and 18.

Figure 13:
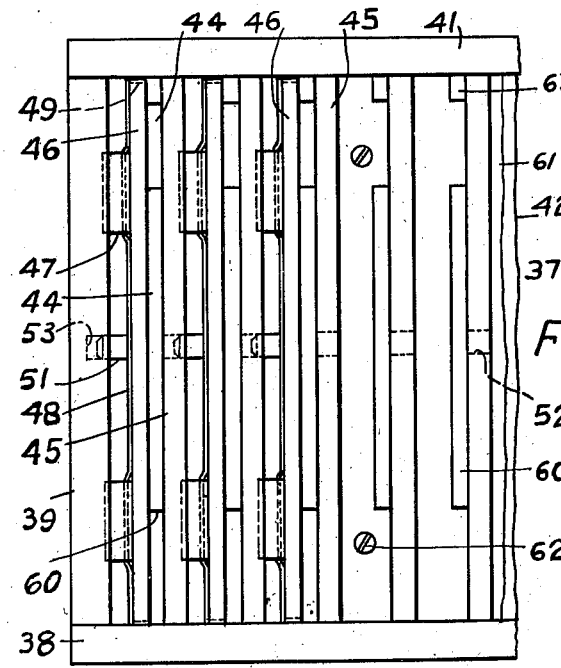
Fig. 13 is a fragmentary end view of the cabinet shown in Fig. 10, between the fixed walls of which are shown the movable spring supporting walls, the necktie holders being removed.

In order to prevent displacement of the movable walls 46 longitudinally within the case, pins 51 are suitably secured on the spring supporting plate members 48, the pins having their free ends projected within apertures 52 formed in the fixed walls 45 of the case, Figs. 9, 11, and 13. A similar aperture 53 is provided in the side wall 39 of the case for a pin 51 carried by the spring supporting plate on the movable wall 46 nearest the side wall 39, Fig. 13.

The holder 23a shown in Figs. 9 and 10 is substantially the same as the holder 23, described above and shown in Figs. 7 and 8, with the exception of the parts provided for shifting the movable walls 46 of the pockets. For this reason only the main features of the modified holder corresponding to those of the holder 23 will be referred to, these being the extension 24a, the operating member 27a thereon, the finger or necktie supporting member 29a and the reduced tie receiving portion 30a thereof. Disposed on the holder 23a is a pair of front and rear cams 54 which take into correspondingly shaped recesses 55 of the movable walls 46 when the holder is moved to its uppermost position within pocket 44 as shown in Fig. 18, the lowest position of the holder being shown in Figs. 9 and 10. The holder is also provided with an arm or extension 56 having at one side thereof a pair of spaced cams 57 similar to the cams 54 and adapted to take into recesses 58, formed in each of the movable walls 46 of the case, Figs. 9, 10 and 18. The holder 23a serves to support the necktie 9a when the holder is being moved into the pocket 44 to the position shown in Fig. 18. In this position of the holder the portion of the necktie which is looped around the reduced portion 30a of the finger 29a of the holder will be partly within the pocket 44 and partly within recesses 59 and 59a formed within the pocket-forming walls 45 and 46 respectively, the pockets being shown by dotted lines in Figs. 9 and 18. It will be understood that the combined thicknesses of the portion 30a of the finger 29a and the looped portion of the necktie thereon will be slightly greater than the combined thicknesses of the opposite portions of the tie depending from the finger. Therefore, by providing the recesses 59 and 59a in the pocket-forming walls 45 and 46 for receiving the looped portion of the tie, clearance for the latter will be afforded so that the movable pocket-forming wall 46 may be urged by the springs 47 into position to press the tie against the fixed wall 45.

When the holder or carrier 23a is at its lowermost position as shown in Fig. 10 the neckties 9a can either be positioned on or removed from the finger 29a, depending on whether or not it is desired to position a tie within the case or to remove one therefrom. When the holder is in the position shown in Fig. 10 the cams 54 will bear against the movable wall 46 and will hold it spaced from the fixed wall 45 a distance somewhat greater than that between the fixed and movable walls when the holder is in the position shown in Fig. 18. Thus, preparatory to and during the time the holder is being moved from the position shown in Fig. 10 to that shown in Fig. 18 the width of the pocket 44 will be greater than the thickness of the depending portions of the tie moving within the pocket, so that rubbing of the tie under pressure against the walls of the pocket is avoided. This is assured both by the cams 54 on the body of the holder and the cams 57 on the arm or extension 56 of the holder, Fig. 16, it being understood that the cams 54 and 57 will move simultaneously into the recesses 55 and 58 respectively of the movable wall 46, thus allowing the springs 47 to shift said walls laterally into position to press the depending portions of the tie within the pocket. Moreover, upon initially moving the holder 23a downwardly from the position shown in Fig. 18 the cams 54 and 57 will move out of the recesses 55 and 58 respectively, thus shifting the movable wall 46 laterally of the case to increase the distance between said wall and the fixed wall 45, thereby permitting the necktie to move downwardly and outwardly from the pocket without undue frictional resistance by reason of its engagement with said walls. The same will of course be true when raising the holder to the position shown in Fig. 18. In other words, it is not possible for the neckties to be made shiny by reason of their movement into and out of the pockets, since they will not be subjected to any rubbing action during movement therein.

On the other hand the pressure exerted on the ties within the pockets when the holder is in the position shown in Fig. 18 will be sufficient to remove all wrinkles, or creases from the ties and at the same time the latter will be protected from dirt, dust and other foreign matter and will be kept in shape and ready for convenient selection and use when needed.

The movement of the walls 46 inwardly by the springs 47 before positioning the ties upon the holders and when the latter are at their uppermost positions is limited by stops at each end of the case. At the closed end of the case a stop 60 is extended within the end of each pocket 44, said stops being suitably secured on a supporting plate 61 held in engagement with the end wall 42 of the case by a suitable number of screws 62, Fig. 13. At the opposite end of the case stops 63 are provided for contact by the lower ends of the movable walls, these stops being preferably secured to the inner face of the front wall 41 by glue or other suitable means, not shown, said stops engaging the fixed walls 45 as shown in Fig. 13.

In view of the fact that the stops 63 are substantially in alinement with the pockets 44 and also with the slots 64 in the front wall 41 of the case the holder or carrier 23a is cut away as indicated at 65 to permit it to clear the stop when the holder is moved to its lowest position as shown in Fig. 10.

The front wall of the case, in addition to being connected with the side walls thereof is also connected with the front edges of the fixed walls 45 by means of a suitable number of screws 66, Fig. 9, which assist in holding said walls against lateral displacement.

Figure 14:
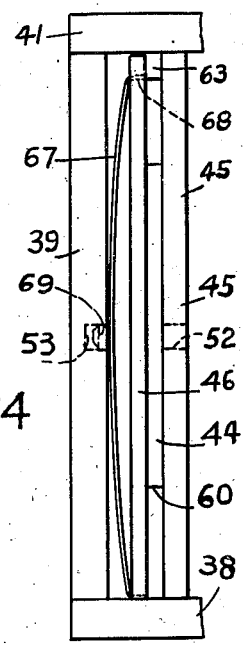
Fig. 14 is a fragmentary end view of a case or cabinet similar to that shown in Fig. 13 with a modified form of resilient means for urging the movable walls of the cabinet in engagement with the neckties when the latter are positioned within the pockets of the cabinet.
Figure 15:
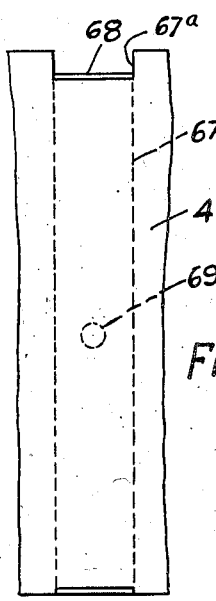
Fig. 15 is a side view of a portion of one of said movable walls showing the manner of notching the same to receive the ends of the spring shown in Fig. 14.

In Figs. 14 and 15 a modified form of resilient means is provided for exerting pressure on the movable walls 46 to urge them in engagement with the neckties within the pockets 44, or in other words to press the ties against the fixed walls 45, it being understood that the case shown in Fig. 14, only a portion of which is disclosed, is the same as the case shown in Figs. 9, 10, 13, 16 and 18. The modified resilient means comprises the bowed leaf springs 67, each of which extends transversely of one of the walls 46 and has its ends 68 offset for extension within notches formed in the opposite edges of said wall as shown in Figs. 14 and 15. The depth of the inner notch is substantially equal to the thickness of the material of the spring so that the inner offset end of the latter will be held seated on or adjacent to the rear wall 38 of the case as shown in Fig. 14. The outer notch 67a is made sufficiently deep to accommodate the outer offset end of the spring in the different positions to which it may be moved when the spring is being tensioned by outward displacement of the movable wall 46 under pressure applied thereto by the cams 54 and 57 of the holder 23a when the holder is being moved to and from the position shown in Fig. 18. The number of the modified springs 67 to be used with each of the movable walls 46 may be varied, depending on the size or capacity of the same. However, it is preferred to provide one spring near each end of said wall and two between the end springs, spaced so that the distances between the several springs will be substantially the same.

One or more of the modified springs 67 for use on each movable wall is provided with a stop pin 69 for extension each within one of the openings 52 in the fixed walls 45 whereby to prevent longitudinal displacement of said movable walls. However, the stop pins on the springs 67 of the movable walls nearest the side wall 39 of the case will take into the recesses 52 in said side wall as shown in Fig. 14.

After the partitions or walls 45 of the case 37 have been secured to the rear wall, but before placing the cover 41 in position, the movable walls 46 with the springs 47 thereon can readily be positioned within the case between the fixed walls as shown in Fig. 9. The necktie holders or carriers 23a will then be placed within the pockets 44 with the operating members 27a therefor omitted. When this has been done the cover 41 will be moved into position upon the case and the extensions 24a of the holders will then project through the slots 64 of the cover ready to receive the operating members, which after being inserted on the extensions will be secured thereon each by a screw, as shown in Fig. 10. The case can then be placed in vertical position upon a suitable support, not shown, and secured thereto preferably by means of screws or nails extended through the openings 43 in the rear wall 38 of the case and into the support.

After completing and mounting the case in the manner described it can readily be filled by folding and placing a necktie on the portion 30a of each holder 23a and moving the holders upwardly within the case to the ends of the pockets 44, in which positions of the holders it is preferred to have the ends of the neckties project slightly below the pockets in order that the user may readily select the one desired, which he can conveniently detach from the holder after moving it downwardly to its lowest position.

In the modification shown in Figs. 19 to 28 inclusive the construction of the necktie receiving case and that of the holders for supporting and moving the ties into and out of the pockets provided therefor is generally similar to that shown in Figs. 1 to 5 inclusive. The principal difference in the two structures resides in the use of laterally movable pocket forming walls in conjunction with mechanisms for shifting said walls into and out of engagement with the neckties within the pockets.

The modified tie receiving case is designated generally by the reference numeral 100, Figs. 19 to 24 inclusive. The case comprises front and rear walls 101 and 102 respectively, side walls 103 and an end wall 104. The side, end and rear walls are connected by suitable means, such for example as glue or other adhesive material, while the front wall is detachably connected with the end and side walls by means of screws 105. The rear wall 102 of the case has suitably connected therewith adjacent its ends transversely extending strips 106 for engaging a vertical support for the case, not shown, to space the case from the support for a purpose which will appear hereinafter. The upper end of said rear wall is provided with apertures 107 for the reception of screws or nails to be driven into the support to secure the case thereon.

The partitions or walls within the case which form the necktie receiving pockets 108 are designated by the reference numeral 109, Figs. 22 to 24 inclusive. The partitions extend substantially the full length of the body of the case and are supported by resilient means described hereinafter which permits the partitions of the different pockets to be moved one laterally of another by suitable operating means whereby to press the neckties within the pockets, the resilient means serving to return the partitions to inoperative positions upon release of the operating means, also described hereinafter.

The tie holders or carriers positioned for movement within the pockets 108 are as previously stated substantially the same as the one shown in Figs. 7 and 8 and have therefore been given the same reference numerals, of which 23 designates the carrier as a whole. The extensions 24 of the carriers project through the longitudinally extending slots 110 of the cover 101 of the case and serve to support the operating members 27, by which the carriers are shifted to move the neckties into and out of the pockets. The means for properly spacing and supporting the pocket forming walls 109 within the case comprises a series of unitary frames, one of which is shown in Figs. 25 and 26 and designated generally by the reference numeral 111. Each of said frames carries means described hereinafter which is operable to effect lateral movement of the walls or partitions 109 at opposite sides thereof and next adjacent thereto for the purpose of exerting pressure on the neckties within the pockets, formed by the partitions. The frame units 111 each includes front and rear rails 112 and 113 respectively. The rails are separated by end posts 114 and 114a, and also by intermediate posts 115 and 115b, to all of which the rails are connected preferably by nails 115a as shown in Fig. 25. The front and rear rails 112 and 113 are provided with anchor pins 116 and 117 respectively which take into apertures 116a and 117a of said front and rear walls as shown in Figs. 20 and 21, the apertures being so located as to provide for the proper distances between the frame units 111 whereby to afford the correct spacings between the partitions 109 in order that the pockets may be of the desired width upon movement of the neckties therein. The pins are positioned within the recesses formed in the rails 112 and 113, as shown in Fig. 25 and are preferably secured therein by means of glue or the like.

The necktie receiving pockets 108 at the opposite sides of the case each has only one movable wall or partition which, together with the fixed opposing side wall 103, forms a pocket within which the necktie is pressed against said fixed wall by outward lateral shifting of the corresponding movable wall.

The means for moving the walls or partitions 109 laterally into position to exert pressure on the neckties supported by the holders within the pockets includes two or more pairs of oppositely disposed cams 118 fixed upon the faces of the partitions nearest the frame unit 111 by suitable means such for example as glue or other adhesive material. Projecting between each pair of cams is an actuating member 119 which is preferably of wedge shaped construction as shown in Fig. 23. The wedge shaped actuating members are fixed on a plunger rod 120 each by a pin 121 and each rod is slidably supported by the posts 114, 115 and 115b of the frame unit 111, Fig. 25. The rod is provided with a collar 122 for engagement with the inner face of the post 114 when the rod is in the position shown in Figs. 23 and 25. The rod is held in said position by the pressure of a spring 123 carried by the rod and having one end in engagement with the post 115 and the other engaging a collar 124 fixed on the rod and against which pressure is exerted to maintain the rod in said predetermined position when the pocket forming walls or partitions 109 are in the position shown in Fig. 23.

The means for holding the partitions 109 against the sides of the frame unit 111 to relieve the pressure on the ties within the pockets comprises a plurality of springs each of which includes a pair of converging arm-like members 125 connected by a transverse part 126, the free ends of the arms being offset outwardly as shown at 127 and the springs being mounted on the rear rail 113 and secured thereon preferably by nails or screws 128 extended through the portions 126 of the spring into the rail, Figs. 25 and 28.

Mounted on the partitions 109 corresponding to each frame unit 111 are several pairs of supporting members 129 which may be connected with the partitions by any means suitable for the purpose. The supporting members include the inwardly offset portions 130 which engage the outwardly offset portions 127 of the spring arms 125, said arms being under sufficient tension to support the partitions in engagement with the sides of the frames 111 as shown in Fig. 28. The partitions are preferably positioned upon the frames before placing the latter within the case. One method of applying the partitions to the frames is to slide them into position thereon by movement in a direction that will cause the offset portions 127 of the spring arms 125 to engage the offset portions 127 of the spring arms 125 as shown in Fig. 28. Placing of the frame units with the partitions thereon within the case will of course be done before applying the cover to the case. When placing the frame units within the case it is of course necessary to see that the pins 117 on the rear rail 113 of the unit take into the corresponding alined apertures 117a of the rear wall 102 of the case. When all of the units with the partitions thereon have been positioned within the case the front wall, or cover can be moved into position upon the side walls, at which time the pins 116 of the front rail of the unit will take into the corresponding apertures 116a of the cover, after which the cover will be secured in position by the screws 105.

The partitions 109 are held against longitudinal movement in one direction within the case by the end wall 104 thereof and in the opposite direction by the stop plates 131, secured to the rail 113 each by the use of one of the nails 115a which connects the rail with the post 114, Fig. 25. The upstanding portion of the stop plate extends on opposite sides of the rail and supports the partitions thereon by engaging the latter within the notches 132 formed in the lower ends thereof, Fig. 24.

Operating means is provided for simultaneously moving the rods or plungers 120 from the release position shown in Fig. 20 to move the wedge shaped parts 119 so as to move the cams 118, secured on the partitions 109 whereby to shift the latter into engagement with ties to exert pressure thereon within the pockets 108.

The operating means comprises a movable actuating member 133 extending transversely of the case and having hinges 134 connecting it with the lower end of the rear wall 102 of the case, the leaves of the hinges being disposed in recesses formed in said wall and said member and secured therein by screws 135, Fig. 24. The hinged actuating member is provided with a series of operating parts or fingers 136 each alined with one of the plunger rods 120 and all serving to contact and move the rods against the resistance of the springs 123 upon movement of the actuating member to the position shown in Figs. 19 and 20. The operating parts 136 may be connected with the actuating member by any suitable means, such for example as by the extensions 137 which are threaded and screwed into nuts 138 disposed in recesses formed in said member, Fig. 24. Upon movement of the actuating member to the position shown in Figs. 19 and 20 the rods 120 will be moved longitudinally of the case by the fingers 136 whereby to advance the wedge shaped members 119 in order to spread the cams 118 which will at the same time operate to shift the partitions 109 laterally into engagement with the ties to exert pressure thereon within the pockets 108. It will be understood that upon swinging the actuating member 133 from service position downwardly to the dotted line position shown in Fig. 20 that the springs 123 will return the plunger rods 120 to the positions shown in Fig. 23, thus relieving the pressure on the cams 118 and allowing the spring leaves 125 to withdraw the partitions from engagement with the ties to free the latter for movement from the pockets by downward movement of the necktie holders to the dotted line position shown in Fig. 23. In the lowered position of any one of the holders the tie thereon can readily be removed therefrom and another placed in position thereon if desired.

It will be understood that movement of the hinged actuating member will be limited by the relatively narrow extensions 103a of the side walls 103 of the case when swinging said member to the operating position shown in Fig. 19 and that it may be readily swung to the dotted line position shown in Fig. 20 without interference by the vertical support, not shown, upon which the case is to be mounted, in view of the clearance afforded by spacing the case from said support by the use of the transverse strips 106 on the rear face of the case, Figs. 20 and 21.

Means is provided for holding the hinged actuating member 133 at the normal service position shown in Fig. 20 when moved to said position, said means comprising a bracket 139 secured to one end of the actuating member, preferably by screws as shown in Figs. 19 and 20. The bracket includes an arm 140 extending at a right angle to the actuating member and is adapted to overlie the relatively narrow extension 103a of the side wall 103, shown in Fig. 19, when the actuating member is at service position. The arm is notched or recessed to receive the free end of a pin 141 for holding the actuating member in service position, the pin being slidably supported in a housing 142 connected with the side wall 103 of the case by suitable means as shown in Fig. 20. The pin is urged in the direction of the arm by a spring within the housing, not shown, and carries an operating knob 143 for retraction by the fingers when it is desired to move the pin to release the bracket, preparatory to swinging the actuating member downwardly to the dotted line position shown in Fig. 20.

A cam 144 is formed on the arm in advance of the notch therein and upon swinging the actuating member upwardly from the dotted line position shown in Fig. 20 the free end of the pin will ride on the cam which will cause the pin to move against the resistance of the spring during contact with the high point of the cam, after which the pin will be moved into the notch by the spring. It will be understood that when the actuating member is approaching the service position shown in Fig. 20 that the free ends of the fingers 136 will engage the spring pressed rods 120 and will move the latter to advance the wedge shaped members 119 whereby to spread the cams 118 which will in turn move the pocket forming walls or partitions 109 laterally into engagement with the neckties within the pockets for the purpose of maintaining the shape of the neckties by exerting pressure thereon, it being understood that the pressure will be sufficient to remove any wrinkles or creases from the ties which may have resulted from one cause or another.

Although only one movable wall or partition is provided for each of the pockets nearest the side walls 103 of the case the pressure exerted on the neckties therein will be sufficient to effect removal of all wrinkles or creases formed in the ties.

To render the neckties accessible it is only necessary to lift the pin 141 far enough to permit the cam 144 to clear the pin, after which the actuating member 133 can be swung to the dotted line position shown in Fig. 20, thus exposing the ends of the ties which project slightly below the pockets when the holders are at service position as shown in Fig. 21. The user may then select any one of the ties desired and render it accessible by moving the holder therefor downwardly to the dotted line position shown in Fig. 20, it being understood that the pressure exerted on the ties within the pockets by the walls or partitions 109 will be immediately relieved upon release of the actuating member 133, since said walls will then be retracted by the spring leaves 125 to the position shown in Figs. 23 and 28. Upon removal of a necktie from any one of the holders another can be placed thereon, after which the holder will be moved upwardly to service position within the pocket corresponding thereto and the actuating member 133 swung into normal operating position as shown in Fig. 20.

It will be further understood that the thickness of the necktie holder will be slightly less than the combined thicknesses of the portions of the tie depending from the holder, so that the latter will not prevent the pocket forming walls from being clamped upon the tie by the means provided for shifting said walls laterally into engagement with the tie. However, at the point where the tie is looped around the reduced portion 30 of the holder, Figs. 7 and 8, the combined thicknesses of said reduced portion and the opposite portions of the tie thereon is slightly greater than the distance between the partitions when they are in service position. In order therefore to accommodate the portions of the tie which contact the reduced portion 30 of the supporting finger of the holder when the latter is in the position shown in Fig. 21 the partitions are provided with recesses 145, Fig. 22, thus affording ample space for said tie portions when the partitions are being held in engagement with the opposite depending portions of the tie to exert pressure thereon, the pressure required to effect removal of the wrinkles or creases from the tie being relatively light. However the degree of pressure may be varied by designing the cams and the operating wedges therefor to vary the pressure within certain limits if desired.

It will be understood that the distance between the partitions of each pocket when said partitions are at release position, as shown in Fig. 22, need be but slightly greater than that between the partitions when they are being urged in engagement with the necktie, or in other words merely sufficient to make it easy to move the holder and the depending portions of the tie thereon downwardly within the pocket, which as a matter of fact can be done even when said portions are in frictional engagement with the inner surfaces of the partitions if only under relatively light pressure, assuming of course that said surfaces are made smooth and polished throughout. It will be obvious therefore that very little lateral movement of the partitions of each pocket will be required to shift them from release position into engagement with the necktie. In view of the nearness of the inner surfaces of the partitions of each pocket when at release position the portions of the necktie looped about the part 30 of the holder and disposed within the recesses 145 will lightly contact the surfaces of the partitions therein when the holder is in the position shown in Fig. 21, in which position the holder will be supported by reason of the slight resistance offered by the contacting of said tie portions with said surfaces.

It will be understood that one of the principal features of the invention is that of providing means for segregating and protecting the neckties of the individual users thereof and that this is accomplished by folding each tie upon itself in the manner described and employing a holder or carrier for positioning it within a pocket or recess where it will retain its shape and be protected against dirt or dust, in readiness for convenient use when needed, as provided for in each of the three different modifications disclosed in Figs. 2, 10 and 20 respectively.

While I have shown and described in considerable detail, certain specific embodiments of my invention, it is to be understood that I do not regard the invention as being limited to the particular forms of construction illustrated or described, since it is evident that they may be modified without departing from the spirit of the invention as defined by the claims.

I claim:

1. In a device of the class described, means forming an elongated pocket for a necktie folded upon itself at a point substantially midway between its ends to form a loop, and a carrier for the necktie movable longitudinally within the pocket between predetermined service and release positions, the carrier having a body portion provided with a supporting finger for receiving the loop of the necktie, said finger being disposed exteriorly of the pocket and said body portion lying therein when the carrier is at release position, said means and said carrier having parts contacting to arrest the carrier at said release positions when moved thereto.

2. In a device of the class described, means forming an elongated pocket for a necktie folded upon itself to form a loop at a point substantially midway between its ends, a carrier for the necktie slotted intermediate its ends to provide a body portion and a tie receiving and supporting finger upon which to insert said loop, the carrier being movable longitudinally within the pocket between predetermined service and release positions with its body portion disposed within the pocket and the supporting finger extending therefrom when the carrier is at release position, said pocket-forming means having a part thereon for engaging and arresting the carrier upon moving it to release position, and an operating member for the carrier projecting laterally from said body portion and transversely of said pocket.

3. A device of the class described comprising a case having an elongated pocket open at one end for the passage thereto of a necktie folded upon itself at a point substantially midway between its ends, the case having a longitudinally extending slot in one wall thereof communicating with the pocket, and a carrier supported for movement longitudinally within the pocket between predetermined inner and outer positions and having an operating member extending through the slot, said carrier also having a part for engaging the necktie between the folded portions thereof, said part being accessible at the open end of the pocket when the carrier is at said outer position, the carrier being movable by said operating member to the other of said positions to move the necktie into the pocket through the open end thereof, said case and carrier having parts contacting one with another to arrest and support the carrier at said outer position when moved thereto.

4. In a device of the class described, means forming an elongated pocket for the reception of a necktie folded upon itself at a point substantially midway between its ends, said means having a slot communicating with the pocket and also having an abutment, and a carrier for the necktie movable to one position within the pocket to move the necktie therein and to another position to move it therefrom, said carrier having an actuating part operable through said slot and cooperating with the abutment to arrest the carrier at the last mentioned position when moved thereto.

5. A device of the class described having a pair of spaced opposing walls forming a recess for the reception of a necktie folded upon itself at a point substantially midway between its ends, one of said walls being movable laterally of the other, means movable between said walls for moving the folded necktie within the recess, and means movable independently of the last mentioned means for shifting said movable wall laterally in the direction of the opposing wall to exert pressure on the necktie within the recess, said necktie supporting means and said movable wall having parts cooperating upon movement of the supporting means in one direction from said inner position to shift the movable wall in a direction away from the opposing wall to relieve the pressure on the necktie exerted by said movable wall.

6. A device of the class described comprising spaced opposing members forming a pocket for a necktie folded upon itself at a point substantially midway between its ends, one of said members being movable laterally in the direction of the other to engage and press the necktie within the pocket, a carrier movable within the pocket between predetermined positions and having a part for engaging the necktie between the folded portions thereof and for moving it longitudinally within the pocket, and resilient means serving to urge said movable member in engagement with the necktie, said carrier and said laterally movable member having parts cooperating to shift the movable member in a direction away from the opposing member upon moving the carrier from one of said positions.

7. A device of the class described comprising a pair of spaced opposing members forming an elongated recess for the reception of a necktie folded upon itself at a point substantially midway between its ends, one of said members being movable in the direction of the other, means for urging said movable member in engagement with a necktie disposed within the recess, a carrier for engaging the necktie between the folded portions thereof, said carrier being movable to a predetermined position within the recess to move the necktie therein, and means controlled by the carrier and serving upon movement of the latter in one direction from said predetermined position to shift the laterally movable member to relieve the pressure on the necktie whereby to free it for removal from the recess.

8. A device of the class described comprising spaced relatively movable members forming an elongated recess for the reception of a necktie folded upon itself at a point substantially midway between its ends, a carrier movable in one direction longitudinally of said members to a predetermined position to move the folded necktie within said recess, resilient means for moving one of said members in the direction of the other to exert pressure on the necktie within the recess, and means responsive to the movement of the carrier from said predetermined position upon moving it in a different direction whereby to effect relative movement between said members to relieve the pressure on the necktie within the recess preparatory to removing it therefrom.

9. A necktie protecting cabinet having a front wall and a plurality of fixed substantially parallel inner walls extending at right angles to said front wall, said inner walls being separated to afford longitudinal spacings therebetween, a laterally movable wall disposed within each of said spacings to divide it into oppositely disposed longitudinally extending pockets one for the reception of a necktie folded upon itself at a point substantially midway between its ends, means within the opposing pocket for shifting the movable wall to press the necktie against the opposing fixed wall, longitudinally extending slots in said front wall in registry with the tie receiving pockets, and devices movable within the last mentioned pockets to position the folded neckties therein, said devices having operative parts extending through said slots.

10. A necktie cabinet having a plurality of tie receiving pockets each formed in part of relatively movable side walls for contacting predetermined portions of the ties disposed within the pockets, members for supporting and moving the ties within the pockets, and means for moving one of the side walls of each pocket relative to the other to exert pressure on the tie within said pocket, each of said tie supporting members and the movable wall corresponding thereto having cooperating cam parts for shifting said wall from tie pressing position to relieve the pressure on the tie when said member is moved from a predetermined position within the pocket.

11. A necktie cabinet having a plurality of elongated pockets each for the reception of a necktie folded upon itself at a point substantially midway between its ends, said pockets having spaced relatively movable side walls for engaging and pressing the neckties positioned within the pockets, carriers for engaging the neckties between the folded portions thereof and for moving them longitudinally within the pockets, said carriers having extensions disposed longitudinally within the pockets and provided with cam means, and means for effecting relative movement between the side walls of the several pockets to exert pressure on the neckties within the pockets, the cam means of each extension operating upon one side wall of the pocket corresponding thereto to move it in a direction away from the opposing side wall upon movement of the carrier in one direction from a predetermined position within the pocket.

12. A necktie cabinet having a plurality of elongated pockets each for receiving a necktie folded upon itself at a point substantially midway between its ends, the side walls of a plurality of the pockets being movable one laterally in the direction of the other to exert pressure on a tie within the pocket corresponding thereto, members movable longitudinally within the pockets to move the folded ties therein and having operating parts projecting laterally from a side wall of the cabinet, resilient actuating means for moving one side wall of each pocket in the direction of the other to press the tie within the pocket, and means within the pockets responsive to the movements of said members and serving to shift the laterally movable walls of the pockets outwardly with respect to the opposing walls thereof upon movement of said members each in one direction from a predetermined position within its pocket.

13. In a device of the class described, a case having an elongated pocket, a carrier having a receiving portion for the loop of a necktie formed by folding the necktie upon itself, the carrier being movable longitudinally within the pocket between predetermined inner and outer positions to move the necktie into and out of the pocket, said receiving portion being accessible when the carrier is at said outer position, and parts on the case and carrier cooperating to arrest and support the carrier at said outer position and to maintain it in association with the case.

14. A necktie protecting case having front, rear and side walls, a plurality of relatively movable substantially parallel walls, within the case affording pockets and spacings occurring alternately between the side walls of the case, necktie carriers movable longitudinally within the pockets and having operating portions disposed between the ends of the case and operable to move the carriers between predetermined inner and outer positions, each carrier having a part for receiving the loop of a necktie folded upon itself, said parts being accessible when the carriers are at said outer positions and serving to move the neckties within the pockets when the carriers are moved to said inner positions, the case having abutments for arresting the carriers at said outer positions, and means within said spacings for effecting relative movement between the walls of the pockets to exert pressure on the neckties therein.

15. A necktie protecting case having a plurality of elongated pockets formed in part of side walls movable laterally one relative to another, a carrier movable longitudinally within each pocket between predetermined inner and outer positions and each having a part for receiving the loop of a necktie folded upon itself, said parts being accessible when the carriers are at said outer positions, the case having abutments for arresting the carriers at said outer positions and the carriers having operating portions for moving them between the inner and outer positions, cam means for effecting relative movement between the walls of each pocket to press the neckties within the pockets, an actuating device for each cam means, and common operating means for said actuating devices.

16. A necktie protecting case having front, rear and side walls, a plurality of substantially parallel movable walls within the case separated to afford pockets and spacings occurring alternately between the side walls of the case, necktie carriers movable longitudinally within the pockets and having operating portions for moving them between predetermined inner and outer positions, each carrier having a part for receiving the loop of a necktie folded upon itself and for moving the necktie within the pocket when the carrier is moved to said inner position, devices disposed within each of the spacings for shifting the movable pocket-forming walls to press the neckties within the pockets, actuating members for said devices, and common operating means manually movable on the case and serving when moved to one position to engage and operate each of the actuating members to move the wall-shifting device corresponding thereto to service position.

17. A necktie protecting case having spaced walls forming an elongated pocket, said walls being relatively movable laterally one with respect to another between necktie release and pressing positions, the case having a longitudinally extending slot communicating with said pocket, a carrier within the pocket having a receiving portion for the loop of a necktie folded upon itself, said carrier having a part extending through the slot and operable to move the carrier between predetermined inner and outer positions within the pocket to move the necktie therein, said receiving portion being accessible when the carrier is at said outer position, cam means for effecting relative movement between said walls to press the necktie within the pocket, operating means for said cam means, and means for moving the walls one relative to another to relieve the pressure on the necktie upon release of the operating means.

FRANCIS JERDONE, Jr.